March 21, 1933.  A. O. AUSTIN  1,902,152
ELECTROSTATIC CONDENSER
Filed June 25, 1924  2 Sheets-Sheet 1

INVENTOR
Arthur O. Austin
BY
Nissen & Crane
ATTORNEYS

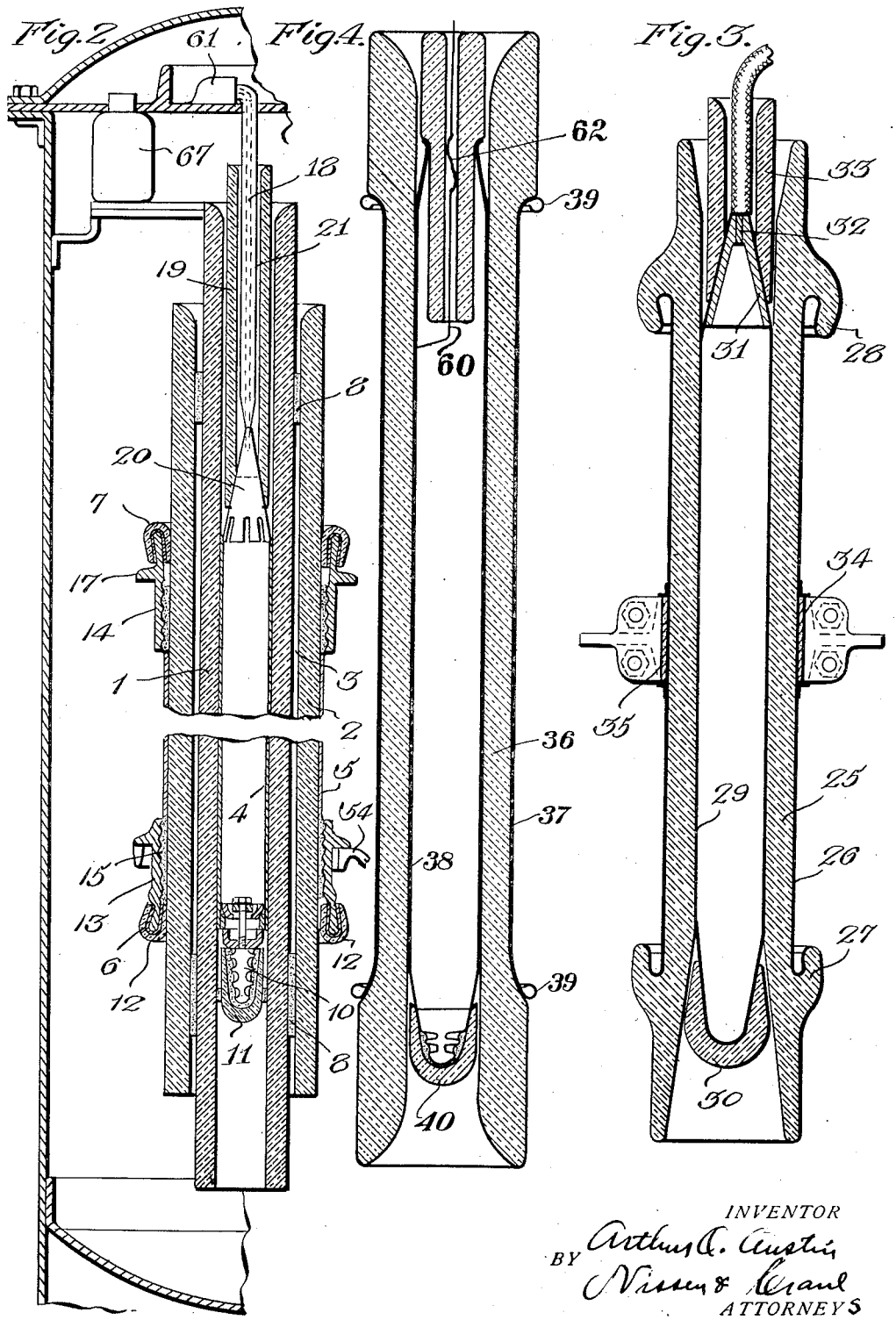

Patented Mar. 21, 1933

1,902,152

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

ELECTROSTATIC CONDENSER

Application filed June 25, 1924. Serial No. 722,205.

This invention relates to condensers especially adapted for use in connection with high potential installations and has for its object the provision of such devices which will give the necessary electrostatic capacity, which will withstand the voltages to which they are subjected, which will have the necessary mechanical strength and will stand up under operating conditions.

The invention is exemplified in the combination and arrangement of parts shown in the accompanying drawings and described in the following specification and it is more particularly pointed out in the appended claims.

In the drawings—

Fig. 2 is a longitudinal section of one form of condenser unit included in the present invention.

Fig. 3 is a section similar to Fig. 2 showing another form of condenser tube.

Fig. 4 is a view similar to Fig. 2 showing another form of condenser tube.

Figure 5:
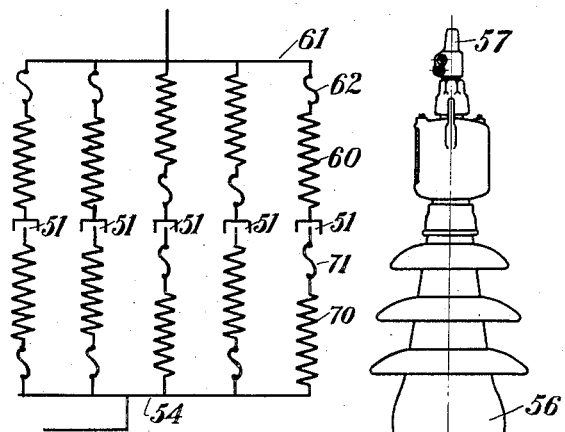
Fig. 5 is a wiring diagram that may be used for connecting several elements in multiple.

In making up electrostatic condenser units or elements, it is desirable to use the properties of glass or porcelain. It is, however, difficult to obtain a high electrostatic capacity and the desirable mechanical strength. Condensers when made up of flat plates are fragile and a break-down in one element is likely to be transferred to all of the plates in the series. There is also a high electrical stress at the edge of the metallic coating due to the bunching of the electrostatic lines of force. This tends to break down the plate at the edge and limits the working voltage.

The proposed construction eliminates or greatly reduces the trouble resulting from these inherent characteristics. While the present form of condenser elements applies particularly to condensers made of porcelain or similar ceramic material, it may be used with other dielectrics. This applies whether the element is used in air or in insulating compound such as oil.

Fig. 2 shows a compound element suitable for the very high voltages and is particularly applicable where it is desired to use a condenser for coupling onto high voltage transmission lines such as 66 k. v. to 135 k. v. or where an exceedingly high factor of safety is desired for reliability.

The condenser element consists essentially or two dielectric members 1 and 2 separated by a space 3 and having metallic coatings or surface coverings.

Either the inside or the outside of the condenser may be coupled to the line as desired. In case the outside is coupled to the line, it is necessary to use a support having ample insulation. This support may be dispensed with by using the insulating tube 1 as a support by holding it at each end. This, however, reduces the path to ground and for that reason may not be advisable.

In a condenser there will be a considerable increase in the stress at the ends of the metallic coating. This stress will be a maximum on the inner surface and will tend to limit the voltage which may be applied. If, however, the inner coating is extended beyond the outer coating, the lines of force will be reduced near the end of the inner coating 4. This will tend to increase the lines of force emanating from the ends 6 and 7 of the outer coating. Since, however, the electrostatic stress on the outer surface is very much less than on the inner surface, it is possible to work the combination with the arrangement shown at a much higher voltage without setting up a dangerous stress in the dielectric at the ends of the coatings than would be possible if the ends of the two coatings were in registration. A very great increase in the working pressures is therefore permissible with this construction, although cylinders of uniform thickness are used for the dielectric. This is a very great advantage in manufacture as cylinders having uniform dielectric thickness are much more easily formed than others and will withstand a greater shock mechanically than where certain parts are thicker.

The two insulating cylinders 1 and 2 are held together by suitable spacers or cement plugs 8 arranged at spaced intervals peripherally of the tubes so as not to seal the space 3. The inner covering 4 may be fitted with a metallic projection 10 to which a closed insulating member 11 is cemented. This insulating member may have a conducting inner surface for controlling the electrostatic field at the end of the lining 11, or may depend upon the metallic member 10 for this purpose. The member 10 is in electrical contact with the inner member 4 gradually recedes from the inner surface of the tubular member 1, permitting the insertion of the insulating member 11 to form an insulated control similar to that shown in my prior Patent No. 1,521,743, Jan. 6, 1925.

This insulated control reduces the maximum stress where the coating leaves the inner surface so that the charging current will not tend to produce a hot spot or cause puncture of the member at this point.

The insulation 11 being placed over the conducting surface prevents discharge from this surface through the oil or air which would occur at considerably lower potential without the insulating member in place. This construction gives a large amount of insulation between the inner and outer electrodes, it being necessary for electrical discharge to follow down the inside of the tube 1 and up over the outside of the ends of the tubes 1 and tube 2.

In order to prevent discharge along the surface of the tube from the lower end 6 of the outer coating 5, it is usually advisable to move this coating away from the tube gradually so as to permit insulation 12 between this member and the tube 2. This may be accomplished by covering the member 6 with a U-shaped insulating ring 12 of vitreous material or with any form of suitable insulating material such as rubber or insulating tape or varnished cambric. If space will not permit, or, if there is objection to the use of insulating material other than air or oil at this point, the electrode 6 need not be covered. In this case it is usually advisable to use a piece of spun metal so as to provide a large radius of curvature at the end.

The metallic coatings 4 and 5 may be electrically or mechanically deposited metal or these coatings may consist of sheet metal or foil coverings. Where thin metal is used, it is generally advisable to provide heavier metal for mechanical support. Castings 13 and 14 supply this need in addition to acting as flux controls to reduce the stress in the dielectric adjacent to the end of the outer coating. These flux controls or supports are in electrical contact with the outer coating and are attached to the main tube by a suitable cement at 15 and 16. These cement rings may be vented to prevent trapping of air or water.

The vertical load may be carried entirely by a shoulder 17 on the upper collar and the lower collar used only for steadying the condenser element.

In order to make electrical contact with the inner surface, it is necessary to bring a lead 18 down through the dielectric members and attach it to the inner coating. One method of accomplishing this is to use a member 20 which is approximately conical and which leaves the inner surface of tube 1 gradually, permitting the insertion of an insulating member 19. This tends to reduce the flux at the point where the contact between the inner metallic member and tube 1 ends. The insertion of insulating member 19 tends to prevent discharge between the conical member 20 and the inner surface of the tube. The lead may also be covered with flexible insulation 21 such as varnished cambric. This tends to center the lead and place a large amount of insulation between the inner and outer surface.

Owing to the separation between the inner and outer surface and the relatively small area of the inner surface, there is little tendency for a discharge to take place from the end 7. This permits a high degree of insulation for a comparatively short end of tubing. To provide a sufficient insulation, it is usually advisable to make this end longer than the other end, although a high insulation on the inner conductor may make it possible to use a comparatively small end.

One method of making a condenser unit is to expand a soft tubular member in the inside tube. This may be accomplished by pressure, rolling or drawing. Another method is to use a thin split tube, the ends of which overlap and which will spring into approximate contact with the inner surface. A better contact may be insured by the insertion of springs or springy material such as cork, which will hold the metal out. This metal may be attached to the inner surface by means of varnish or other suitable holding material.

If a sanded zone or projecting points are provided on the inner face of tube 1, the thin metal may be pressed down around these points so that the points will hold the coating securely in position. By properly locating this point of attachment, the effects of expansion and contraction may be minimized. If the metallic coating is in a single piece, it is usually advisable to secure it at its longitudinal center. If the tube is made up in two pieces so as to reduce expansion, it is usually advisable to make the fixed point at the longitudinal center of each section.

The outer coating may be made by winding a strip of sheet metal in a helix about the tube 2, permitting the edges of the coating to overlap. If the overlapping joints are soldered at intervals and the soldered places staggered or offset, they will provide for longitudinal expansion and contraction. By using a small space 3 between the tubes, it is possible to provide a condenser having a high degree of reliability and at the same time make up for unevenness in the tubular members. This is particularly true where the condenser element is operated in oil.

With a construction as shown, it may be possible to operate even with a break in the inner member. Owing to the thickness in the outer member and the oil in the space 3, there may be little or no discharge at the break. If, however, there were a metallic coating along the outer surface of the tube 1, there would very likely be a heavy discharge between the inner and outer parts along the break. This would cause considerable heat which would result in the destruction of the outer element.

For the same reason a break in the outer tube might cause little or no trouble under normal operating voltages and with the construction as shown it is possible to have a break or defect in each tube, providing the two breaks are sufficiently far apart so as to interpose enough insulation or striking distance to prevent a discharge from one to the other.

Fig. 3 shows a condenser element in which a single tube 25 is employed having an outer coating 26 of thin sheet metal. The dielectric tube 25 is provided with backwardly turned flanges 27 and 28 at the ends of the coating 26, the coating being disposed on the surface of the pockets formed by the flanges. This provides an insulated control for the flux at the edges of the outer element of the condenser. The inner element 29 may be formed similarly to that in Fig. 2 but the ends of the tube constituting this element are tapered. The lower end may be rounded and covered by a dielectric cup 30 to control the flux at this point. The opposite end may be spun or otherwise formed about a conical contact member 31 secured to the conductor lead 32. The dielectric tube 33 surrounds this end of the member 29 where it unites with the lead 32. The unit is supported by a collar 34 clamped about it near the middle and provided with a pad 35 of cork or other suitable substance.

Fig. 4 shows another modification in which the dielectric member 36 is thickened adjacent the ends of the metallic elements 37 and 38. The outer element 37 may be rolled at its edges as shown at 39 to prevent sharp edges from which discharge would take place.

A flux control 40 is provided for this free end of the element 38 similar to that of Fig. 2 and a conductor lead extends through an insulator tube at the top of the inner metallic element. The lead may be constructed to provide a material resistance in series with the condenser element and also to constitute a fuse.

Where electrostatic condensers are operated at high voltages and there is considerable capacitance a break-down in any one of the elements or near the condensers will usually be followed by a severe oscillation. This oscillation may produce further damage either to elements in the condenser or to other equipment.

The present invention comprises means to minimize this trouble as far as possible and to eliminate the defective condenser element.

Figure 1:
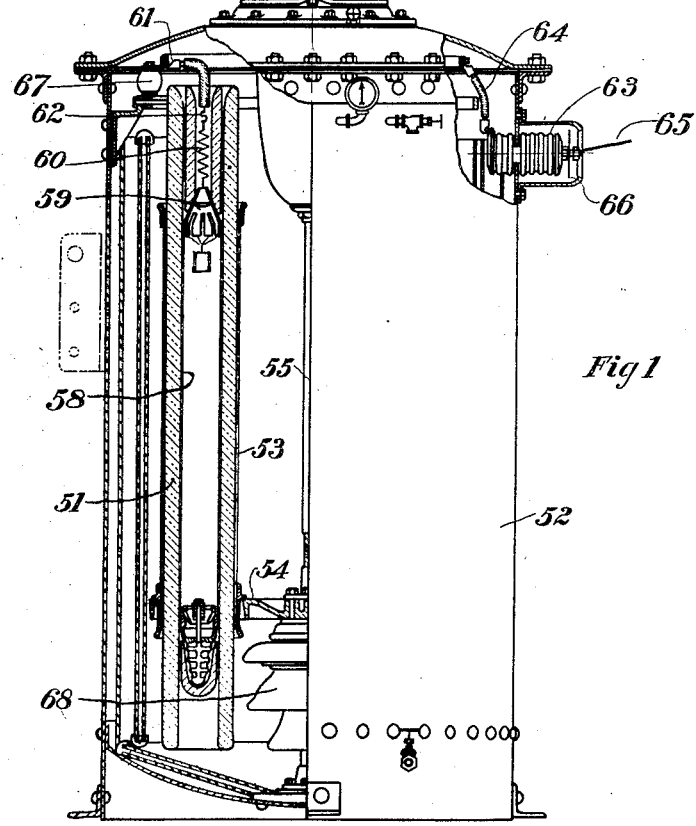
Fig. 1 is an elevation partly in section of a condenser housing provided with a plurality of units in parallel and having insulator bushings and conductor leads connected with the condenser elements.

Fig. 1 shows the application to a coupling condenser used in carrier current telephone work or signal service but the same scheme applies equally well to condensers used for coupling electrical circuits or for condensers used for power factor correction.

In Fig. 1 the complete condenser unit consists of a number of electrostatic condenser units, 51 in a tank or case 52. The outer surface coatings 53 of the condensers are electrically connected to a grid or spider 54 which is in turn connected electrically to a lead 55 which passes up through the entrance bushing 56. A connection is made to the line on the bushing at terminal 57. The inner coating of each condenser unit 58 is connected by a conical member 59 to a resistance 60. A connection is made between the resistance 60 and the lead or bus 61 by a fuse 62. The bus 61 may be connected directly to the case in power factor connection work or where the case is insulated or may be connected through outlet bushing 63 by a lead 64. A lead 65 is connected to the outer terminal of the outlet bushing and constitutes the connection to the low voltage side of the condenser. A limited gap 66 is provided so that if the lead 65 is disconnected or has too high an impedance inserted in it, the voltage rise will be limited. The bus 61 is insulated from the case by insulators 67. The spider 54 which is in electrical contact with the high voltage side of the condenser is insulated from the case by the insulator 68. For very high voltage work the case is filled with insulating oil, although the condenser may be operated at a considerable voltage by increasing the air pressure inside the tank.

In general condensers are composed of a number of cells or condenser units in multiple, which are connected on one side to a common bus 61 or on the other side to a common bus 54. This general construction may be modified materially without affecting the general effectiveness of the scheme. Where the electrostatic capacity is rather small or is connected to a circuit of long impedance, the voltage due to the resulting disturbance may cause little or no damage. In this case, the resistance is unimportant with the exception that it may save the condenser from break-down under very severe voltage and frequency conditions.

It is evident that where a very high frequency is imposed on a condenser such as in the case of a stroke of lightning, the flow of current into the condenser will be relatively large; hence, the resistance drop in the resistance 60 might be very high although the resistance drop might be negligible under normal frequency used in voltage for signal work. Since the current flowing into a given condenser varies in voltage and frequency it is apparent that on very high frequency it may be in the order of a million or even a billion cycles. A resistance may be very effective and still have no appreciable effect at normal frequency which may be on the order of 60 cycles or possibly 100 cycles in the case of a carrier current or telephone work.

In carrier current installations the voltage impressed on the condenser is comparatively low whereas in a severe surge the voltage is high; hence, there is little loss of energy in the resistance where the condenser is used for signal current or carrier current work or for power factor connection.

Under severe surge conditions, however, the loss in the resistance may be increased several thousand or even millions of times; hence, the resistance may be very effective in preventing damage to the condenser element or in damping out or preventing a surge following the break down of an element or an arcing ground for the small impedance between the condenser and the ground.

Where the condenser is immersed in oil the blowing out of a comparatively small fuse may serve to disconnect the element although the condenser is connected to a high voltage line. To insure cutting out of the unit it is generally advisable to insert a considerable gap in the circuit. The conical member which is in spring contact with the inner coating of the condenser is held by the fuse 62 and the resistance 60 which are in series. When the fuse blows the resistance and the contact cone 59 will slide down the tube inserting a considerable distance between the inside of the condenser plate and the bus. This will effectively disconnect the unit. The blowing of the fuse itself may be sufficient to force the cone and resistance down the tubular condenser. In case, however, there is not sufficient energy, the cone 59 and resistance 50 will be weighted so that they will fall away.

Where there is sufficient distance to permit of a sufficient length of fuse wire, the fuse may constitute the resistance connection. It is evident that either the fuse or resistance may be used alone depending upon conditions. Where the fuse only, is used the defective unit may be disconnected in case of failure but a larger fuse will be necessary to take care of abnormal conditions. The condenser may be subjected to very high frequency and high voltage, particularly where the resistance is in circuit in series with the condensers. Where the resistance is in circuit under these conditions, there will be a considerable voltage drop and the current flowing into the element will be less, therefore a much smaller fuse may be used, without danger of blowing under the abnormal conditions.

In a condenser the electrostatic capacity increases approximately inversely as the thickness; hence, a condenser having a thinner dielectric member will have a higher electrostatic capacity. The danger of failure, however, of thin members is greater. Since the improvement tends to lower the maximum voltage condition on the condenser unit and permits disconnecting a unit if it should happen to fail it is possible to use weaker members and thereby lower the cost of the condenser for a given electrostatic capacity. Placing the resistance close to the individual unit tends to minimize trouble to much greater extent than where the resistance is placed outside of the entire condenser, as in the latter case the resistance may have little effect upon a surge inside of the case.

In Fig. 5 a number of condenser units 51 are shown connected in parallel with resistances 60 and fuses 62 in series therewith. In addition to the resistances 60 and fuses 61 the opposite elements of the condenser may be supplied with resistances and fuses shown at 70 and 71 respectively. It will be apparent that various combinations of fuses and resistances may be used.

The reliability of the condenser element constructed in this manner is many times that where a metallic coating is used on each surface of a single dielectric member.

I claim—

1. A condenser unit comprising a tubular dielectric member, a covering of conducting material for a portion of the inner surface of said tubular member, a covering of conducting material for a portion of the outer surface of said tubular member, a member of conducting material extending from the end of said inner covering and spaced inwardly from the wall of said tubular member, and a closed cap of dielectric material covering said extending member.

2. A condenser unit comprising a dielectric tubular member, a conductor constituting one element of said condenser unit and disposed within said tubular member and a flux control for said conductor comprising a closed dielectric cap arranged to cover the end of said conductor and having the sides thereof extending between said conductor and said tubular member.

3. A condenser unit comprising a tubular member of dielectric material, a metallic covering for a portion of the inner face of said tubular member, a metallic covering for a portion of the outer face of said tubular member, a metallic member forming a continuation at the end of said inner metallic covering and extending beyond the said outer metallic covering in the direction of the length of said tubular member and a dielectric member disposed over the end of said metallic member to provide a flux control for said inner covering.

4. A condenser unit comprising a tubular dielectric member, a metallic covering for a portion of the inner face of said tubular member, a metallic covering for a portion of the outer face of said tubular member, conductor means constituting a continuation of said outer covering, the extremity or said continuation being spaced outwardly from said tubular member and a covering of dielectric material for said extremity and extending backwardly over the outer surface thereof.

5. A condenser unit comprising a tubular dielectric member, a metallic covering for a portion of the inner surface of said tubular member, a metallic covering for a portion of the outer surface of said tubular member, conductor means constituting continuations of said coverings, the end of said continuations being spaced from the surfaces of said tubular member, and dielectric material disposed over the extremities of said continuations and extending backwardly over the outer and inner surfaces thereof.

6. A condenser unit comprising a dielectric tubular member, a metallic covering for a portion of the inner surface of said tubular member a metallic covering for a portion of the outer surface of said tubular member, metallic members constituting continuations of said coverings, the inner continuation extending longitudinally of said tubular member beyond said outer continuation, the extremities of said continuations being spaced from the surfaces of said tubular member, and dielectric material disposed about the extremities of said continuations and extending backwardly over the surfaces thereof to provide flux controls for said metallic coverings.

7. A condenser unit comprising a dielectric tubular member, a metallic member arranged within said tubular member and constituting one element of said unit, one end of said metallic member being tapered and spaced from the wall of said tubular member, a conductor lead connected with said end and a dielectric member surrounding said end.

8. A condenser unit comprising a dielectric tubular member of substantially uniform bore, a metallic covering for a portion of the inner face of said tubular member, said covering having an inwardly tapering continuation at one end thereof, a conductor lead connected with said continuation, and dielectric material within said tubular member but separate therefrom surrounding said tapered continuation.

9. A condenser unit comprising a dielectric tubular member, a metallic covering for a portion of the inner face of said tubular member, said covering having an inwardly tapering continuation at one end thereof spaced from the inner wall of said tubular member, a conductor lead connected with said continuation, and a tubular member of dielectric material disposed within said first mentioned tubular member but formed separately therefrom and surrounding the connection of said conductor lead with said continuation.

10. A condenser unit comprising a dielectric tubular member of substantially uniform bore and open at both ends, a metallic covering for a portion of the inner face of said tubular member, metallic covering for a portion of the outer face of said tubular member, said inner covering having an inwardly tapering continuation extending longitudinally of said tubular member beyond said outer covering but terminating within said tubular member, and a conductor lead connected with said continuation.

11. A condenser unit comprising a dielectric tubular member, a metal supporting ring secure to the outer face of said tubular member, a metallic covering surrounding said outer face and connected with said supporting ring, the edge of said ring away from said covering being thickened and spaced away from said tubular member, and a covering of dielectric material for said edge.

12. A condenser unit comprising a dielectric tube, a pair of metallic rings surrounding said tube and spaced longitudinally thereof, a metallic covering for said tube between said rings, and dielectric coverings for the edges of said rings disposed away from said metallic covering.

13. A condenser unit comprising a tubular dielectric member, a pair of metallic rings secured to said tubular member in spaced relation to one another, a metallic covering connected with said rings and disposed over the face of said tubular member between said rings, the extremities of said rings away from said covering being thickened, and spaced outwardly from the face of said tubular member, coverings of dielectric material for said extremities and a metallic element within said tubular member extending longitudinally thereof beyond the extremities of said rings.

14. A condenser unit comprising a tubular member of dielectric material, a metallic covering for the outer face of said member, said covering being terminated backwardly from the ends of said member, a metallic covering for the inner face of said tubular member, conductor means connected at the ends of said inner covering and extending longitudinally of said tubular member beyond the outer metallic covering, dielectric material disposed about one of said conductor means, a conductor lead connected to the other of said conductor means, and dielectric material surrounding the end of said conductor means connected with said conductor lead.

15. A condenser unit comprising a pair of tubular members arranged one within the other, the inner one of said members extending beyond the outer member at each end thereof, means for holding said members in spaced relation to each other, a metallic covering for a portion of the outer face of said outer member, supporting rings secure to said outer member and connected with said metallic covering at each end thereof, the outer edges of said rings being thickened and covered with dielectric material, a metallic element arranged within said tubular member and extending beyond the outer edges of said rings, dielectric material covering one extremity of said inner metallic member to provide a flux control, the other end of said inner metallic member tapering inwardly away from the surface of said inner tubular member, a conductor lead connected with said inwardly tapering end, and dielectric material within said tubular member surrounding said tapering end and of said conductor lead.

16. In combination a plurality of tubular condenser units, means for supporting said units in a casing for containing an insulating liquid in which said condenser units are immersed, said units being disposed in said casing with their axes in spaced relation to one another, a common bus conductor for corresponding elements of said units and a resistance member between each of said elements and said bus conductor.

17. In combination a tank having insulating liquid therein, a plurality of condenser units in parallel in said tank, each unit comprising a dielectric tube, having an inner and an outer metallic element, and resistance and fuse members in series with each insulator unit.

18. In combination a tank having insulating liquid therein, a plurality of dielectric tubes immersed in the liquid in said tank, each tube having an inner and an outer metallic covering to form the elements of condenser units, common bus conductors for corresponding elements of said units, and a fusible resistance member within each of said tubes to connect the inner element of said tube with its bus conductor.

19. A condenser unit comprising a tubular dielectric member, a metal coating covering a portion of the inner surface of said member and constituting one conductor element of said condenser unit, said coating having a conducting extension at one end thereof, a metal coating covering a portion of the outer surface of said tubular member and constituting the other conductor element of said condenser unit, and a dielectric covering disposed over said extension of the conductor element on the inner surface of said tubular member, said dielectric covering being extended backwardly from said end and covering the outer surface of said extension.

20. An electrical structure comprising a plurality of adjacent columns of condenser units, insulating supporting means for said structure, each of the columns comprising one or more condensers, and one or more transverse braces between the columns whereby the same are maintained in fixed relation to form a unitary structure.

In testimony whereof I have signed my name to this specification on this 21st day of June, A. D. 1924.

ARTHUR O. AUSTIN.